(12) United States Patent
Dawson et al.

(10) Patent No.: US 10,502,104 B2
(45) Date of Patent: Dec. 10, 2019

(54) FLUID SYSTEM

(71) Applicant: Castrol Limited, Pangbourne (GB)

(72) Inventors: Christopher Dawson, Royston (GB); Steven Paul Goodier, Berkshire (GB); Gary Howard, Royston (GB); Adrian Michael Woodward, Royston (GB)

(73) Assignee: Castrol Limited, Reading (GB)

( * ) Notice: Subject to any disclaimer, the term of this patent is extended or adjusted under 35 U.S.C. 154(b) by 165 days.

(21) Appl. No.: 15/312,577

(22) PCT Filed: May 21, 2015

(86) PCT No.: PCT/EP2015/061335
§ 371 (c)(1),
(2) Date: Nov. 18, 2016

(87) PCT Pub. No.: WO2015/177317
PCT Pub. Date: Nov. 26, 2015

(65) Prior Publication Data
US 2017/0089234 A1   Mar. 30, 2017

(30) Foreign Application Priority Data
May 21, 2014  (GB) .................................. 1409065.8

(51) Int. Cl.
*F01M 1/10* (2006.01)
*F01M 13/04* (2006.01)
(Continued)

(52) U.S. Cl.
CPC ........... *F01M 1/10* (2013.01); *B01D 19/0031* (2013.01); *F01M 1/02* (2013.01); *F01M 11/00* (2013.01);
(Continued)

(58) Field of Classification Search
CPC .... F01M 1/10; F01M 1/02; F01M 2001/1071; F01M 2001/1085; F01M 11/00;
(Continued)

(56) References Cited

U.S. PATENT DOCUMENTS 2,538,983 A   1/1951  Sharples
2,705,053 A   3/1955  Morris
(Continued)

FOREIGN PATENT DOCUMENTS

CN   102877912   1/2013
DE   102012024365   6/2014
(Continued)

*Primary Examiner* — Michael R Mansen
*Assistant Examiner* — Robert T Reese
(74) *Attorney, Agent, or Firm* — McDonnell Boehnen Hulbert & Berghoff LLP

(57) ABSTRACT

This invention relates to an oil reservoir system for an engine comprising: an oil container which includes an oil reservoir, which is in fluidic communication with an oil circulation system of an engine, a ventilated headspace and an oil filter located at the interior of said oil container. The invention also relates to a method for deaeration of an oil of an oil reservoir which is in fluidic communication with an oil circulation system of an engine. Furthermore, the invention relates to a vehicle comprising the oil reservoir system.

17 Claims, 3 Drawing Sheets

(51) Int. Cl.
*F01M 1/02* (2006.01)
*F01M 11/00* (2006.01)
*B01D 19/00* (2006.01)
*F16N 39/00* (2006.01)

(52) U.S. Cl.
CPC ........ *F01M 11/0004* (2013.01); *F01M 13/04* (2013.01); *F16N 39/002* (2013.01); *F01M 2001/1071* (2013.01); *F01M 2001/1085* (2013.01); *F01M 2001/1092* (2013.01); *F01M 2011/0095* (2013.01)

(58) Field of Classification Search
CPC .. F01M 11/0004; F01M 13/04; F01M 13/023; F10M 2001/1092; F10M 2011/0095; B01D 19/0031; B01D 29/232; F16N 39/002; F16K 15/063
See application file for complete search history.

(56) References Cited

U.S. PATENT DOCUMENTS

| | | | |
|---|---|---|---|
| 3,771,287 A | 11/1973 | Sunderland | |
| 3,839,996 A * | 10/1974 | DeBiasse | F01M 13/023 |
| | | | 123/1 R |
| 4,075,099 A | 2/1978 | Pelton et al. | |
| 4,151,823 A | 5/1979 | Grosse et al. | |
| 4,903,654 A | 2/1990 | Sato et al. | |
| 5,152,890 A * | 10/1992 | Linnersten | B01D 29/15 |
| | | | 210/315 |
| 5,454,354 A | 10/1995 | Miller | |
| 5,640,936 A * | 6/1997 | Hudson | F01M 1/12 |
| | | | 123/196 A |
| 6,048,454 A | 4/2000 | Jenkins | |
| 6,539,912 B1 | 4/2003 | Beer | |
| 8,500,869 B1 | 8/2013 | Johnson et al. | |
| 2006/0137940 A1* | 6/2006 | Gunji | F01M 11/0004 |
| | | | 184/106 |
| 2007/0039475 A1 | 2/2007 | Unfried et al. | |
| 2009/0020366 A1* | 1/2009 | Mori | F01M 5/001 |
| | | | 184/106 |
| 2010/0031915 A1* | 2/2010 | Riedel | F01M 11/0004 |
| | | | 123/196 R |
| 2011/0253092 A1 | 10/2011 | Springer et al. | |
| 2012/0267294 A1* | 10/2012 | Herman | B01D 29/232 |
| | | | 210/137 |
| 2014/0034580 A1* | 2/2014 | Chen | B01D 36/003 |
| | | | 210/708 |
| 2014/0182716 A1* | 7/2014 | Yamada | F16K 15/026 |
| | | | 137/535 |
| 2015/0291317 A1 | 10/2015 | Brett et al. | |
| 2015/0291318 A1 | 10/2015 | Barnes et al. | |
| 2015/0292371 A1 | 10/2015 | Barnes et al. | |
| 2015/0292372 A1 | 10/2015 | Barnes et al. | |
| 2015/0292674 A1 | 10/2015 | Brett et al. | |
| 2016/0023145 A1* | 1/2016 | Greco | B01D 35/0276 |
| | | | 210/741 |
| 2017/0089235 A1 | 3/2017 | Dawson et al. | |
| 2017/0089236 A1 | 3/2017 | Andersen et al. | |
| 2017/0101911 A1 | 4/2017 | Barnes et al. | |
| 2017/0107873 A1 | 4/2017 | Ali et al. | |
| 2017/0122151 A1 | 5/2017 | Brett et al. | |
| 2017/0183992 A1 | 6/2017 | Barnes et al. | |
| 2017/0190466 A1 | 7/2017 | Andersen et al. | |
| 2017/0197596 A1 | 7/2017 | Barnes et al. | |

FOREIGN PATENT DOCUMENTS

| | | |
|---|---|---|
| JP | S58 82414 | 6/1983 |
| JP | S58-112415 | 8/1983 |
| JP | S59-135314 | 9/1984 |
| JP | H1-102417 | 7/1989 |
| JP | H05 296018 | 11/1993 |
| JP | H05-096410 | 12/1993 |
| JP | H06-323118 | 11/1994 |
| JP | H09-308805 | 12/1997 |
| JP | 2005-036677 | 2/2005 |
| JP | 2006 291849 | 10/2006 |
| JP | 2008-073606 | 4/2008 |
| JP | 2009-019531 | 1/2009 |
| JP | 2012-125722 | 7/2012 |
| WO | 2016/158971 | 10/2016 |
| WO | 2017/053750 | 3/2017 |
| WO | 2017/053755 | 3/2017 |

* cited by examiner

FLUID SYSTEM

CROSS REFERENCE TO RELATED APPLICATIONS

The present application is a National Phase application of, and claims the benefit of, International (PCT) Application No. PCT/EP2015/061335, filed on May 21, 2015, which claims priority to GB Application No. 1409065.8, filed on May 21, 2014, the entire contents of both which are incorporated herein by reference.

This invention relates to an oil reservoir system for an engine comprising an oil container which includes an oil reservoir, which is in fluidic communication with an oil circulation system of an engine, and a ventilated headspace; the system also comprising an oil filter located at the interior of said oil container. The invention also relates to a method for deaeration of an oil of an oil reservoir which is in fluidic communication with an oil circulation system of an engine. Furthermore, the invention relates to a vehicle comprising the oil reservoir system.

Many engines make use of one or more fluids for their operation. Such fluids are often oil compositions and include, for instance, engine oil, lubricating oil and hydraulic oil. For example, internal combustion engines use lubricating oil compositions. Also, electric engines use heat exchange oils for example to cool the engine, to heat the engine or to cool and heat the engine during different operating conditions. Such oils are generally held in reservoirs associated with the engine and may require periodic replacement, for instance when the quality of the oil is no longer acceptable.

The quality of the oil is commonly assessed based on its level of contamination. For example, lubricating oil compositions used in internal combustion engines may contain soot particles, solid precipitants, dirt and sludge contaminants which compromise the lubricating properties of the oil, leading to excessive engine wear. In order to extend the life of oils used in engines, oil filters are typically relied upon to prevent, reduce, manage or ameliorate oil contamination by trapping contaminants in a suitable filter medium, which is routinely replaced or cleaned. The oil filter is typically located upstream of sensitive components of the engine and typically downstream of the pump.

In addition to contamination with solid particulate, another issue affecting the performance of oil compositions used for engines is the level of aeration of the oil. As a result of exposure of oil compositions to air during use, air may become dissolved or otherwise entrained in the oil compositions to a varying degree. For instance, in the lubrication system of an internal combustion engine, oil is pumped from a reservoir to supply bearings and other components of the engine which are susceptible to wear. As the oil is distributed over the moving components of the engine, the likelihood of dissolution and/or entrainment of air is increased significantly.

In the case of a dry sump engine system, oil drains into a shallow sump at the bottom of the crankcase, from where it is pumped by a scavenger pump to an external oil reservoir. This stage of the circulation involves pumping of a mixture of oil and air from the crankshaft, which exacerbates oil aeration. At least one further pump is also used in the dry sump system for redistributing the lubricating oil to the engine. Significant oil aeration lowers the lubricating efficiency of the oil, which can lead to excessive engine wear, undesirable heating of the engine and a general reduction in engine efficiency. More generally, entrained air in oil can also lead to undesirable oil oxidation.

A common means for reducing oil aeration is the integration of an oil deaerator into the system. A typical oil deaerator is, for instance, described in U.S. Pat. No. 2,538,983, which is used in connection with an internal combustion engine. The oil deaerator disclosed therein comprises a cylindrical tank and relies on centrifugal forces that are developed when the oil is sprayed tangentially against the cylindrical inside surface of the tank in order to help separate air which is entrained in the oil.

Similarly, U.S. Pat. No. 2,705,053 relates to oil degasification and a lubricating system. That system includes an oil reservoir, and a source of mist of lubricating oil and gas; an oil degasifying device connected to said oil reservoir. Said degasifying device comprises: a helically arranged conduit provided with an inlet for gas and oil at its upper end and an oil outlet at its lower end in communication with said oil reservoir; a helically arranged, similarly inclined conduit of smaller external radius of generation than said first-named conduit and telescoping and co-axially arranged with respect to said first-named conduit, said smaller conduit having a closed lower end, a gas outlet at the upper end and a series of radially outwardly extending ports in communication with the first-named conduit. Means are also provided for supplying mixed oil and gas at high velocity from a source to the inlet of said first named conduit.

The form of deaeration described in both U.S. Pat. Nos. 2,538,983 and 2,705,053, i.e. that which relies on developing centrifugal forces, is known to be insufficient for removing significant quantities of entrained gas from oil. There remains a need for a simplified solution to the problems of oil contamination and aeration of oil used in oil circulation systems of engines.

It has been found by the present inventors that the location and arrangement of an oil filter, forming part of an oil reservoir system which is in fluidic communication with an oil circulation system of an engine, can be utilised for deaeration of an oil, in addition to the removal of solid contaminants therefrom.

According to an aspect of the present invention, there is provided an oil reservoir system for an engine, which engine comprises an oil circulation system, the reservoir system comprising:

an oil container comprising an oil reservoir which is in fluidic communication with an oil circulation system of an engine, and a headspace which is in fluidic communication with a ventilation means;

an oil filter located at the interior of the oil container and in fluidic communication with the oil reservoir; and wherein the oil filter is constrained such that when oil is circulated by the oil circulation system of the engine, oil is forced through the oil filter and out into the body of oil in the reservoir.

The term "oil" used herein is intended to include all oils, mixtures of different oils and oil compositions which may be used in oil circulation systems of engines. Thus, for example, lubricating oil compositions comprising one or more oil base stocks and at least one lubricating oil additive are intended to be covered by the term "oil" herein. Similarly, a single oil for use as a hydraulic oil in an oil circulating system of an electric engine is intended to be covered by use of the term "oil" herein.

Mixtures of oil and gas, including aerated oils, may take several different forms. The term "unbound gas/air" used herein is intended to refer to gas which is essentially free of any entrainment in oil (not suspended therein). In a container comprising a mixture of oil and gas, large bubbles of gas (those of more than 1 mm diameter) maybe free to move through the liquid oil phase, for instance, as a result of the different densities of the two fluids, such that the oil and gas occupy two distinct layers within the container. In such an arrangement, the gas layer sitting above the oil layer corresponds to unbound gas/air.

Alternatively, gas may be entirely dissolved in oil to the extent that the particles of the gas are fully integrated into the liquid phase. This form of gas is referred to herein as "dissolved gas/air". Typically, petroleum oils comprise up to 9 vol. % of dissolved air per bar absolute pressure. The solubility of gases in a liquid oil phase is typically proportional to the pressure of the oil. Consequently, as the pressure of an oil decreases, for example during its passage through crankshaft oil drillings, the solubility of dissolved gas therein also decreases. Gas particles thus may come out of solution and form small bubbles in the liquid, which may become entrained in the oil.

Thus, a further form of oil-gas mixture is where gas is suspended in the liquid oil phase without being dissolved in the oil. For instance, it is possible for small bubbles (for example, those of less than 1 mm diameter) to remain substantially suspended in a liquid oil phase, particularly in high viscosity oils. This form of gas is referred to as "entrained gas" herein. Larger bubbles of gas that have mobility in an oil may also be considered to be entrained gas, when these bubbles do not have an escape path to a free surface (i.e. to an interface with unbound gas/air), such that they remain entrained in the oil.

The pressure of an oil can also have an indirect effect on the level of entrained gas therein. As described above, when dissolved gas comes out of solution, entrained gas is formed. As a result, decreasing the pressure of an oil can lead to increased levels of entrained gas therein. When the pressure of an oil is decreased, solubility of dissolved gas decreases so that gas dissolved in the oil comes out of solution, and is thereby effectively converted to entrained gas. This has a particularly negative impact for oil circulating in an oil circulation system of an engine. Lower pressures are observed in the vicinity of the moving parts of the engine, where substantial lubrication is required, yet the amount of entrained gas in the oil, which is far more detrimental to lubrication properties than dissolved gas, is likely to be higher at this stage of the cycle.

A yet further form of an oil-gas mixture is a foam, which is generally formed when there is a major proportion of gas phase dispersed within the liquid oil phase. Oil based foams typically comprise closely packed bubbles of gas surrounded by a thin film of liquid oil phase. Foam only occurs where oil is in fluidic contact with an unbound gas/air surface.

It has been found that when oil having entrained gas as described above flows through an oil filter in accordance with the present invention, entrained gas may be separated from its suspension in oil and vented to a ventilated headspace within the oil container of the fluid reservoir system.

The invention will now be described by way of example only and with reference to the following drawings in which FIGS. 1 and 2 represent in schematic cross-section, oil reservoir systems according to embodiments of the present invention.

Figure 1:
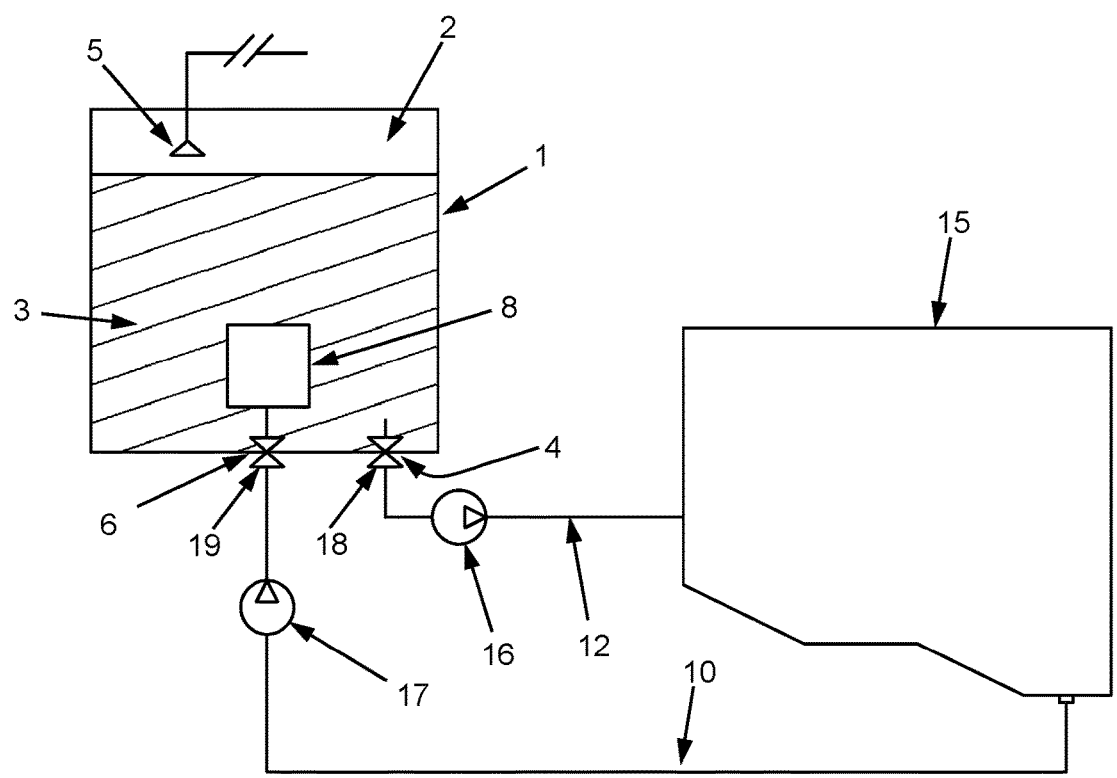
FIG. 1 is a schematic of an oil reservoir system for an engine according to an embodiment of the present invention.

Referring to FIG. 1, an oil reservoir system comprises an oil container 1 comprising: a ventilated headspace 2 above an oil fluid reservoir 3. An oil outlet 4 is arranged to couple the oil reservoir 3 in fluidic communication with an oil circulation system of an engine 15, so as to supply oil from reservoir 3 to the engine 15, via return line 12 and by means of return pump 16. A ventilation means in the form of breather 5 is arranged so as to couple the headspace 2 with a crankcase ventilation system of the engine, thereby allowing gas to be passed into and out from the container 1. An oil inlet 6 is arranged to couple the oil reservoir 3 in fluidic communication with the oil circulation system of the engine 15, so as to provide oil reservoir 3 with oil from the engine 15, via scavenger line 10 and by means of scavenger pump 17. In FIG. 1, oil is circulated by means of return and scavenger pumps 16 and 17, respectively. However, the present invention is not so limited. The oil circulation system may be either of an open or closed loop oil circulation system.

An oil filter 8 is located at the interior of the oil container 1 and is preferably at least partially submerged in the oil of reservoir 3, as shown in FIG. 1.

In some embodiments, oil filter 8 is arranged such that oil entering the container is conveyed directly to the oil filter 8. As shown in FIG. 1, the oil filter 8 is arranged in the container 1 such that, when oil is circulated by the oil circulation system of the engine, oil is conveyed from scavenger line 10 through inlet 6 of the container 1 directly to the oil filter 8. When oil enters oil filter 8, entrained gas in the oil collects at the surface of the filter medium (not shown) and forms larger bubbles, before being forced through the filter medium. Filtered oil emerges from oil filter 8 and enters the body of oil in the reservoir 3. Large bubbles also exit the oil filter 8 and enter the body of oil in the reservoir 3, from where they travel upwards to the headspace 2 of the container 1, which is ventilated by means of breather 5.

In some embodiments, the oil reservoir system may comprise an oil container 1 which includes an outlet 4 and an inlet 6 which independently comprise ports comprising self-sealing valves and/or non-return valves 18, 19.

In general, self-sealing ports have the characteristic that when corresponding ports are being connected, a seal is made between the connecting ports before valve or valves open to allow fluid to flow. On disconnection, the valve or valves close to seal off each of the ports before the seal between the ports is broken. Suitable valves include spring loaded poppet valves and biased non-return valves. Each self-sealing port may provide a "dry break" in which no fluid flows on connection or disconnection of the ports. Alternatively, each self-sealing port of the system may provide a "damp break" in which there is flow of only a non-essential amount of fluid, for example a few drips of liquid, on disconnection or connection of the port.

In some embodiments, the oil container 1 may be a self-contained replaceable unit fixable for fluidic communication with the oil circulation system of the engine. Thus, a replaceable oil container 1 may be provided as a self-contained system containing fresh, refreshed or unused engine lubricating oil composition which may conveniently replace an existing external oil container for an engine, which container comprises a reservoir containing used or spent engine lubricating oil composition. If the existing oil container to be replaced also contains an oil filter, that may also be replaced together with the spent oil composition. Such a replaceable oil container 1 may be manufactured from metal and/or plastics material. Suitable materials include reinforced thermoplastics material which for example, may be suitable for operation at temperatures of up to 150° C. for extended periods of time. Such an oil container 1 may suitably comprise one or more latches to fix the container in fluidic communication with the oil circulation system of the engine.

Still referring to FIG. 1, the headspace 2 above the oil reservoir in the container 1 is in fluidic communication with a ventilation means 5. In some embodiments, the ventilation means 5 may suitably comprise a vent port arranged on the container. In some embodiments, a vent port is connected in fluidic communication with the engine (for example to the air inlet manifold of an internal combustion engine), gas may flow into the headspace or out of the headspace of the container. This facilitates modification of the oil pressure in the reservoir, for instance such that it is higher or lower than the pressure of the engine crankcase. In some embodiments, the vent port is connected to a breather or a vent tube extending into the headspace. The vent tube may suitably be located at a location distant from the oil reservoir 3 and the oil filter 8 so as to reduce or mitigate ingress of oil into the vent tube. In at least some examples, the oil reservoir comprises a perforate deflector adapted to inhibit fluid flow into the vent tube whilst allowing flow of gas into and out from the vent tube. These and any other examples of the disclosure may reduce or mitigate the risk of fluid entering a vent tube in the headspace.

Figure 2:
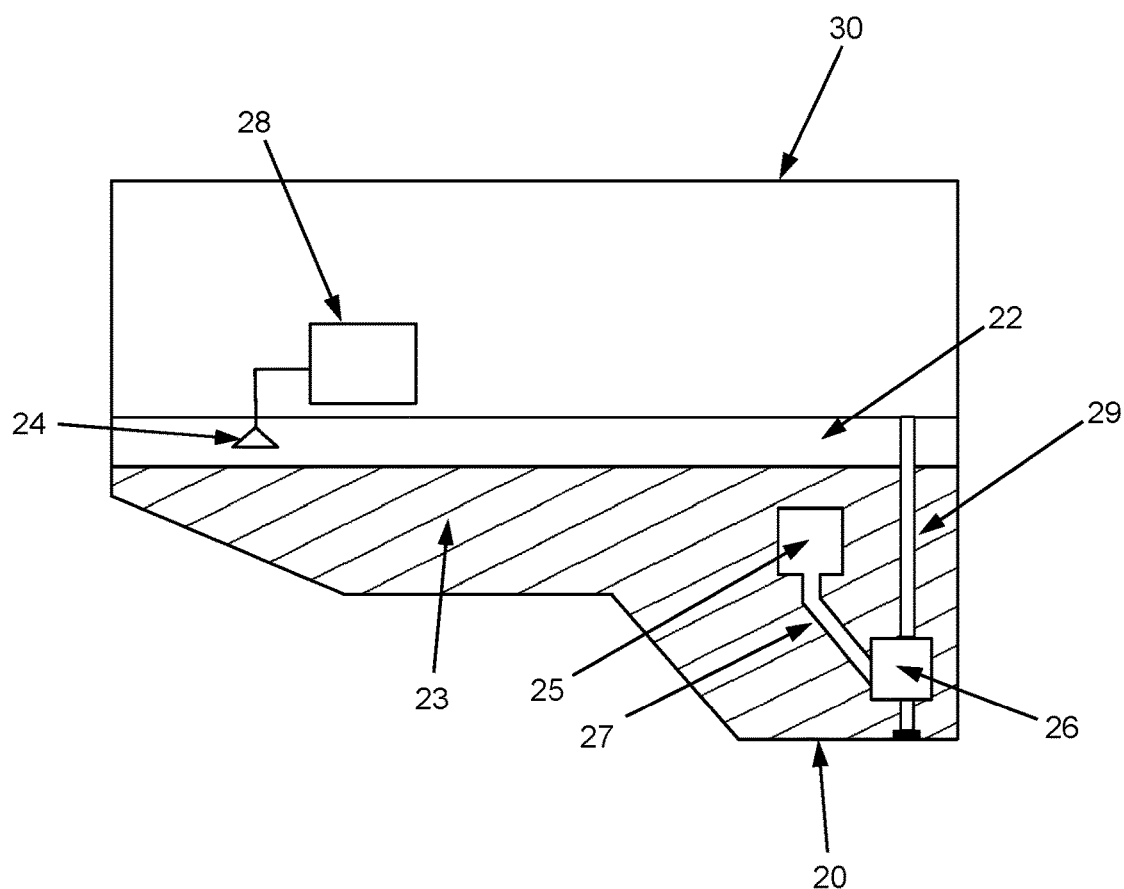

FIG. 2 is a schematic cross-section of oil reservoir system for an engine according to another embodiment of the present invention. Referring to FIG. 2, an oil reservoir system comprises an oil container in the form of an oil pan 20 located at the bottom of the crankcase of an engine 30 comprising: a ventilated headspace 22 above an oil reservoir 23; a ventilation means in the form of a breather 24 arranged so as to couple the headspace 22 with a crankcase ventilation system 28 of the engine. A primary oil pump 26 is arranged so as to pump oil from the reservoir 23 to the moving components of the engine via line 29. An oil filter 25 is submerged in the oil of oil reservoir 23 of the oil pan 20. Oil filter 25 is arranged so that when oil is circulated by pump 26 oil flows into the filter 25. In some embodiments, as shown in FIG. 2, oil which has been pressurised by pump 26 is conveyed directly to the oil filter 25 by means of an outlet, such as bleed line 27 from the pump 26.

When oil enters oil filter 25, entrained gas in the oil collects at the surface of the filter medium (not shown) and forms larger bubbles, before being forced through the filter medium. Filtered oil emerges from oil filter 25 and enters the body of oil in the reservoir 23. Large bubbles also exit the oil filter 25 and enter the body of oil in the reservoir 23, from where they travel to the headspace 22, which is ventilated by means of breather 24.

As shown in FIG. 2, in some embodiments, the oil container may suitably comprise an oil pan 20 located within the sump space of an engine crankcase, for example, as in the case of a wet sump system for an internal combustion engine. During circulation of oil by the oil circulation system of the engine, which in FIG. 2 comprises pump 26, oil may drain from the moving components of the engine 30 and collect in the oil pan 20. The oil pan 20 may be integral with or secured to the crankcase of the engine. The oil reservoir 23 is therefore formed in the oil pan 20 at the bottom of the crankcase where oil which has drained from the engine components has collected.

The headspace 22 above the oil reservoir 23 is in fluidic communication with a ventilation means. The ventilation means may suitably comprise the crankcase ventilation system 28 of the engine. Gas in the crankcase may be supplied to the air intake manifold of the engine. For example, the crankcase may comprise a positive crankcase ventilation (PCV) system comprising a PCV valve, which may feed gas in the crankcase back into the air intake manifold. In another example, the crankcase may comprise a closed crankcase ventilation system.

Figure 3:
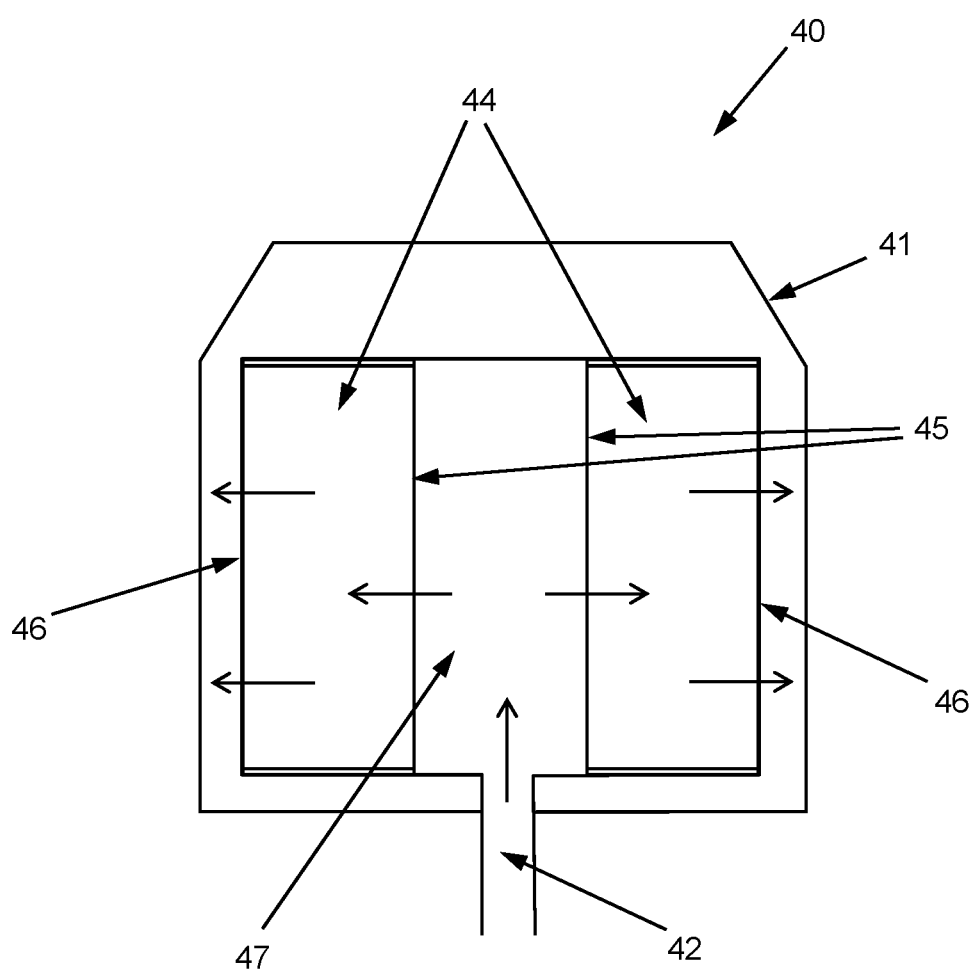
FIG. 3 represents in schematic cross-section, an oil filter suitable for use in the oil reservoir system of the present invention. In the drawings, like reference numerals are used to indicate like elements.

FIG. 3 is an exposed view of an example oil filter 40 for use with the oil reservoir system of the present invention. Oil filter 40 comprises a filter medium 44 with an inner surface 45 defining an inner region 47 and an outer surface 46. In FIG. 3, during operation, oil flows through the inlet 42 and into the inner region 47 of the oil filter 40 before passing through the filter medium 44, after which it is expelled from the filter 40 to the body of oil in the oil reservoir of the container.

It has been found that when oil having entrained gas as described hereinbefore flows through an oil filter 40, entrained gas which is suspended in the oil does not readily penetrate the filter medium, which helps remove entrained gas from the oil. Without being bound by any particularly theory, it is believed that small bubbles of entrained gas are brought into contact with each other at the surface 45 of the filter medium 44, where the small bubbles combine to form larger bubbles which are less capable of being held in suspension by the oil. The larger bubbles of gas which collect on the surface 45 of the filter medium 44 may subsequently be forced through the filter medium 44 upon the build-up of pressure in the filter from pumping the circulating oil.

Larger bubbles of gas which exit the filter 40 enter the body of oil in the reservoir of the oil container, where they are not readily held in suspension, having mobility in the oil phase. Thus, when the oil filter 40 is located at the interior of an oil container comprising an oil reservoir and a ventilated headspace, as illustrated in FIGS. 1 and 2, the gas which exits the oil filter 40 may travel to the headspace of the container (i.e. following an escape path), where it may be ventilated with the other unbound gas occupying the headspace.

The flow direction of oil, which is through the filter 40 and out to the body of oil of the reservoir of the container, and the presence of the ventilated headspace are considered to be critical to the process of removing entrained gas and thereby deaerating the oil. Again, without being bound by any particular theory, it is believed that without the ventilated head space, gas which might be removed from suspension in the oil upon passage through the filter medium may subsequently be re-entrained in the oil upon exiting the oil filter. Re-entrainment of gas maybe as a result of, for instance, the pressures the oil-gas mixture is exposed to in the absence of ventilation. Moreover, without an escape path for entrained gas to follow to an area accommodating unbound gas, bubbles remain entrained in the oil, and thus contribute to a higher level of oil aeration.

There are several advantages to the oil reservoir system described herein. One such advantage is that it may obviate the use of a separate deaerator device for deaeration of oil used in an oil circulation system of an engine. Another advantage is that the oil flow configuration in the oil reservoir system of the present invention affords greater control in terms of handling and distribution. A further advantage of locating the oil filter at the interior of the oil container is that this may allow a finer oil filter to be used than in alternative setups, for instance, where the oil filter is integrated on a suction line (connected to a return pump inlet port), a pressure line, or a return line of an oil circulation system for an engine. This may have one or more of the following benefits: (a) increased filtration efficiency; and (h) finer filtration. A yet further advantage of locating the oil filter at the interior of the oil container is that this may allow a larger oil filter to be used than in alternative setups. This may have the benefit that i) entrainment by the oil of particulate held in the filter medium as a result of a blockage or in the case of excess back pressure through the filter can be substantially avoided; and ii) lifetime of the filter may be increased.

In some embodiments, as shown in FIG. 3, the oil filter 40 comprises a filter medium 44 which has an inner surface 45 defining an inner region 47 of the filter medium 44 and an outer surface 46, wherein the inner surface 45 is of smaller surface area than the outer surface 46, and, when oil is circulated by the oil circulation system of the engine, oil is directed to the inner region 47 of the filter medium from where it is forced outward through, and out of, the filter medium 44.

In alternative embodiments, the oil filter 40 comprises a filter medium 44 which has an inner surface 45 defining an inner region 47 of the filter medium 44 and an outer surface 46, wherein the inner surface 45 is of smaller surface area than the outer surface 46, and, when oil is circulated by the oil circulation system of the engine, oil is directed to the outer surface 46 of the filter medium from where it is forced inward through, and out of, the filter medium 44 into the inner region 47 (i.e. the opposite flow direction to that depicted in FIG. 3).

In all embodiments, filtered oil emerges from the oil filter 40 and into the body of oil of the oil reservoir of the container. In this arrangement, bubbles of gas emerge from the filter and also enter the oil reservoir from where they can travel, by virtue of the difference in density, to the ventilated headspace which sits above the oil reservoir.

The oil filter described hereinbefore comprises a filter medium. Suitable oil filters include a filter medium typically comprising cellulose, fiberglass and/or metal filter elements. Preferably, the filter elements of the filter medium are pleated. The filter may be suitable for filtering particles in the range 1 to 100 microns, suitably in the range 2 to 50 microns, for example in the range 3 to 20 microns. The oil filter may operate at elevated pressure. Such filters are well known in the art and can be readily adapted for different oil flow directions through the filter medium, as well as through the filter.

In some embodiments, as shown in FIG. 3, the oil filter 40 comprises a tubular filter medium 44 defining a central channel 47 and oil is forced radially through the filter medium. Examples of such filters include spin-on filters which may be mounted in-line with oil filter inlet piping, as well as cartridge- or canister-type filters, which may be adapted for different directions of flow of oil through the filter medium.

In some embodiments, as illustrated in FIG. 3, the oil filter 40 comprises a filter housing 41 comprising an inlet 42 for oil and an outlet (not shown). In some examples, the inlet 42 and outlet of the filter housing 41 each comprise a conduit which includes a non-return valve. In other examples, the housing 41 may comprise at least one perforated, or otherwise permeable, surface so as to allow the passage of oil and gas out of the oil filter 40 and into the body of oil of the reservoir.

In some embodiments, the oil filter 40 may further comprise an overflow relief means (not shown) configured such that oil entering the oil filter 40 is diverted so that it does not pass through the filter medium 44 of the filter and does not entrain particulate material which is held by the filter medium 44, when the filter medium 44 is blocked or there is excessive back pressure. In some examples, said overflow relief means comprises a bypass valve.

The oil filter may be located at the interior of the oil container by mounting inside the oil container by any suitable means of which the skilled person is aware, for instance by securing to an interior wall of the oil container. The oil filter may thus be mounted inside the container such that it is fully, or at least partially, submerged by oil in the oil reservoir of the container, when oil is being circulated by the oil circulation system of the engine.

Other variations and modifications of the system will be apparent to persons of skill in the art in the context of the present disclosure.

The engine may be any form of engine suitable for use with a motor. Suitable engines include internal combustion engines, which may be characterised by spark ignition or compression ignition, turbine engines and electric engines.

During operation, the oil reservoir of the oil container contains an oil. The oil may, for instance, be a lubricating engine oil composition or a heat exchange oil composition for an electric engine. The engine lubricating oil composition may have heat exchange properties.

The engine lubricating oil composition may comprise at least one base stock and at least one engine lubricating oil additive. Suitable base stocks include bio-derived base stocks, mineral oil derived base stocks, synthetic base stocks and semi-synthetic base stocks. Suitable engine lubricating oil additives are known in the art. Examples of additives include organic and/or inorganic compounds. Typically, according to at least some examples, the engine lubricating oil composition comprises about 60 to 90% by weight in total of base stocks and about 40 to 10% by weight additives. Suitable engine lubricating oil compositions include lubricating oil compositions for internal combustion engines.

The engine lubricating oil composition may be a mono-viscosity grade or a multi-viscosity grade engine lubricating oil composition. Examples of suitable engine lubricating oil compositions include single purpose lubricating oil compositions and multi-purpose lubricating oil compositions.

According to at least some examples, the engine lubricating oil composition is a lubricating oil composition for an internal combustion engine, for example a spark ignition internal combustion engine and/or a compression ignition internal combustion engine.

The oil composition may be a heat exchange oil composition for an electric engine. Thus, an external oil container may be provided as a self-contained system containing fresh, refreshed or unused heat exchange oil composition for an electric engine which may conveniently replace an existing external oil container for an electric engine, which container comprises a reservoir containing used or spent heat exchange oil composition. If the existing oil container to be replaced also contains an oil filter, that may also be replaced together with the spent or oil composition.

Suitable heat exchange oil compositions for electric engines include those which comprise organic and/or non-organic performance boosting additives. Suitable heat exchange fluids include be man-made or bio-derived oil compositions. According to at least some embodiments, the heat exchange oil compositions have hydraulic characteristics.

The oil for circulation by the circulation system of the engine may thus comprise entrained gas. For example, the oil may comprise over 5 vol. % entrained gas, over 10 vol. % entrained gas, over 20 vol. % entrained gas, over 30 vol.

% entrained gas, or over 40 vol. % entrained. In some embodiments, the oil may comprise between 5 vol. % and 15 vol. % entrained gas. In other embodiments, the oil composition may comprise over 50 vol. % entrained gas.

According to another aspect, the present invention also provides a method of reducing the amount of entrained gas in an oil of an oil reservoir system for an engine, which engine comprises an oil circulation system, said method comprising the steps of i) locating an oil filter in an oil reservoir within an oil container of the oil reservoir system; and ii) constraining the oil filter such that, when oil is circulated by the oil circulation system of the engine, oil is forced through the oil filter and out into the body of oil in the reservoir. The oil reservoir system may be as described hereinbefore and be in fluidic communication with an oil circulation system of an engine by any suitable means as described hereinbefore In some embodiments, the oil container comprises an oil inlet and the method comprises arranging the oil filter such that oil entering the oil inlet of the container is conveyed directly to the oil filter.

In other embodiments, the oil container comprises an oil pan located within the sump of the engine; the oil circulation system of the engine comprises a pump located in the reservoir of the oil pan; and the method comprises arranging the oil filter so that it is in fluidic communication with an outlet of the pump which supplies oil which has been pressurised by the pump.

The oil filter used in the method aspect of the invention may be any oil filter as described hereinbefore.

In yet another aspect, the present invention provides a vehicle comprising the oil reservoir system described hereinbefore. Suitable vehicles include motorcycles, earthmoving vehicles, mining vehicles, heavy duty vehicles and passenger cars.

The invention claimed is:

1. An oil reservoir system comprising:
   an oil container comprising an oil reservoir which is in fluidic communication with an oil circulation system of an engine, a vent port, a headspace which is in fluidic communication with the vent port, and an inlet and an outlet which each independently comprise a port comprising a self-sealing valve or a non-return valve; and
   an oil filter located in an interior of the oil container and in fluidic communication with the oil reservoir,
   wherein the oil filter is constrained such that when oil is circulated by the oil circulation system of the engine, oil is forced through the oil filter and out into a body of oil in the oil reservoir, such that when oil having entrained gas flows through the oil filter, the entrained gas is separated from suspension in the oil.

2. An oil reservoir system according to claim 1, wherein, when oil is circulated by the oil circulation system of the engine, the oil filter is at least partially, or fully, submerged in oil in the oil reservoir.

3. An oil reservoir system according to claim 1 wherein the oil filter comprises a filter medium which has an inner surface defining an inner region of the filter medium and an outer surface, wherein the inner surface is of a smaller surface area than the outer surface, and, when oil is circulated by the oil circulation system of the engine, oil is directed to the inner region of the filter medium from where it is forced outward through, and out of, the filter medium.

4. An oil reservoir system according to claim 1, wherein the oil filter comprises a filter medium which has an inner surface defining an inner region of the filter medium and an outer surface, wherein the inner surface is of a smaller surface area than the outer surface, and, when oil is circulated by the oil circulation system of the engine, oil is directed to the outer surface of the filter medium from where it is forced inward through, and out of, the filter medium into the inner region, before entering the body of oil of the oil reservoir.

5. An oil reservoir system according to claim 1, wherein the oil filter comprises a tubular filter medium defining a central channel and, when oil is circulated by the oil circulation system of the engine, oil is forced radially through the filter medium.

6. An oil reservoir system according to claim 1, wherein the oil filter comprises a filter housing comprising an inlet for oil and an outlet, and wherein the inlet and outlet of the filter housing each comprise a conduit which includes a non-return valve.

7. An oil reservoir system according to claim 1, wherein the oil filter further comprises an overflow relief configured such that oil entering the oil filter is diverted so that it does not pass through the filter medium of the filter and does not entrain particulate material which is held by the filter medium when the filter medium is blocked or there is excessive back pressure.

8. An oil reservoir system according to claim 7, wherein the overflow relief comprises a bypass valve.

9. An oil reservoir system according to claim 1, wherein the inlet is in fluidic communication with the oil circulation system of the engine and the oil filter is arranged such that oil entering the inlet is conveyed directly to the oil filter.

10. An oil reservoir system comprising:
    an oil pan located within a sump of an engine, wherein the oil pan comprises an oil reservoir which is in fluidic communication with an oil circulation system of the engine, wherein the oil circulation system comprises a pump in the oil reservoir, and wherein the pump is arranged to pump oil from the oil reservoir to the engine via a first outlet of the pump;
    a headspace which is in fluidic communication with a ventilation system of the engine; and
    an oil filter located in the oil pan and in fluidic communication with the oil reservoir, wherein the oil filter is in fluid communication with a second outlet of the pump which supplies oil which has been pressurized by the pump, and wherein the oil filter is constrained such that when oil is circulated by the oil circulation system of the engine, oil is forced through the oil filter and out into a body of oil in the oil reservoir, such that when oil having entrained gas flows through the oil filter, the entrained gas is separated from suspension in the oil.

11. An oil reservoir system according to claim 1, wherein, when oil is circulated by the oil circulation system of the engine, entrained gas is separated from suspension in the oil upon passage through the filter medium of the filter and gas exiting the oil filter passes through the body of oil in the oil reservoir to the ventilated headspace.

12. A method of reducing the amount of entrained gas in an oil of an oil reservoir system for an engine, which engine comprises an oil circulation system, said method comprising the steps of i) locating an oil filter in an oil reservoir within an oil container of the oil reservoir system, wherein the oil container comprises an inlet and an outlet which each independently comprise a port comprising a self-sealing valve or a non-return valve; and ii) constraining the oil filter such that, when oil is circulated by the oil circulation system of the engine, oil is forced through the oil filter and out into a body of oil in the oil reservoir, such that when oil having entrained gas flows through the oil filter, the entrained gas is separated from suspension in the oil.

13. A method according to claim 12, wherein the method comprises arranging the oil filter such that oil entering the inlet is conveyed directly to the oil filter.

14. An oil reservoir system according to claim 10, wherein the ventilation system comprises either a closed crankcase ventilation system or a positive crankcase ventilation (PCV) system.

15. A method of reducing the amount of entrained gas in an oil of an oil reservoir system for an engine, which engine comprises an oil circulation system, said method comprising the steps of i) locating an oil filter in an oil reservoir within an oil pan located within a sump of the engine, wherein the oil circulation system comprises a pump in the oil reservoir, wherein the pump is arranged to pump oil from the oil reservoir to the engine via a first outlet of the pump, and wherein the oil filter is in fluid communication with a second outlet of the pump which supplies oil which has been pressurized by the pump; and ii) constraining the oil filter such that, when oil is circulated by the oil circulation system of the engine, oil is forced through the oil filter and out into a body of oil in the reservoir, such that when oil having entrained gas flows through the oil filter, the entrained gas is separated from suspension in the oil.

16. An oil reservoir system comprising:
an oil container comprising an oil reservoir which is in fluidic communication with an oil circulation system of an engine, a vent port, a headspace which is in fluidic communication with the vent port, and an inlet and an outlet which each independently comprise a port comprising a self-sealing valve or a non-return valve; and
an oil filter located in an interior of the oil container and in fluidic communication with the oil reservoir,
wherein the oil filter is constrained such that when oil is circulated by the oil circulation system of the engine, oil is forced through the oil filter and out into a body of oil in the oil reservoir, such that when oil having entrained gas flows through the oil filter, the entrained gas is separated from suspension in the oil and gas exiting the oil filter passes through the body of oil in the oil reservoir to the headspace.

17. A method of reducing the amount of entrained gas in an oil of an oil reservoir system for an engine, which engine comprises an oil circulation system, said method comprising the steps of i) locating an oil filter in an oil reservoir within an oil container of the oil reservoir system, wherein the oil container comprises an inlet and an outlet which each independently comprise a port comprising a self-sealing valve or a non-return valve; and ii) constraining the oil filter such that, when oil is circulated by the oil circulation system of the engine, oil is forced through the oil filter and out into a body of oil in the oil reservoir, such that when oil having entrained gas flows through the oil filter, the entrained gas is separated from suspension in the oil and gas exiting the oil filter passes through the body of oil in the oil reservoir to the headspace.

* * * * *